Aug. 2, 1932.    J. DALLOS    1,869,366

CONTACT GLASS

Filed Dec. 31, 1931

Inventor:

Josef Dallos

Patented Aug. 2, 1932

1,869,366

UNITED STATES PATENT OFFICE

JOSEF DALLOS, OF BUDAPEST, HUNGARY, ASSIGNOR TO CARL ZEISS, OF JENA, GERMANY

CONTACT GLASS

Application filed December 31, 1931, Serial No. 584,146, and in Germany January 6, 1931.

The correction effect of the usual contact glasses is generally produced by a liquid lens which, when the glass is being used, forms between the cornea of the eye and the interior surface of the vaulted corneal part of the glass. The effect of the liquid lens is determined by the curvatures of the cornea and the said interior surface. It has been tried to always give the interior surface one and the same radius of curvature which, mostly in order to prevent the cornea and the glass from touching each other, has to be for instance 8 millimeters long. The consequence thereof is, however, that the correction effect is no longer produced by the liquid lens alone, in which case the contact glass must be neutral, but that it is generally required to produce an additional effect by grinding a correspondingly refracting surface in the corneal part and this in the exterior surface of the same. This procedure is disadvantageous in so far as in the case of a converging and a diverging effect great additional effects, for instance effects surpassing 10 dioptres, cause the central thickness and the edge thickness, respectively, of the corneal part to assume values which greatly increase the weight of the contact glass, thus making a comfortable wearing impossible.

The invention relates to a contact glass with correction effect, which consists as usual of a vaulted corneal and an annular sclerotic part, and overcomes the said disadvantage by making the exterior surface of the corneal part consist of two differently curved surfaces and the interior surface of one surface only. The desired additional effect of the corneal part is produced only by its central part, which must have such a diameter that it covers the greatest diameter possible with eye pupils. The other part of the corneal vault is of no optical effect, for which reason the radius of curvature of its exterior surface is governed only by the necessity of achieving the greatest possible durability of the contact glass.

The accompanying drawing illustrates in central sections on an enlarged scale two constructional forms of the new contact glass.

Figure 1:
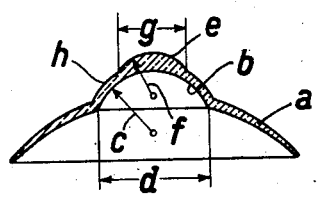
Figure 2:
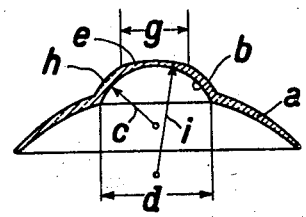

Figures 1 and 2 show contact glasses having a converging and a diverging effect, respectively.

Both constructional forms have an annular sclerotic part $a$ and a vaulted corneal part the interior surface $b$ of which has a radius of curvature $c=8$ millimeters and a greatest diameter $d=12$ millimeters. In the contact glass represented by Figure 1 the exterior surface of the corneal vault consists of a central part $e$, the radius $f$ of which is inferior to the radius of curvature $c$ and whose greatest diameter is $g=8$ millimeters, and an annular part $h$ the exterior surface of which is an equidistant to the interior surface $b$.

In the constructional form according to Figure 2 the exterior surface of the corneal vault likewise consists of two parts. It differs from the one according to Figure 1 only in that the radius $i$ of the central part $e$ is greater than the radius of curvature $c$. The greatest diameter of the part $e$ is, again, $g=8$ millimeters.

It is obvious that the constructional forms according to Figures 1 and 2 represent contact glasses with additional converging and diverging effect, respectively. By means of the new contact glass it is possible to attain the greatest practically required additional effects without the necessity of any undesired accumulation of glass.

I claim:

Contact glass with correction effect, consisting of a vaulted corneal part and an annular sclerotic part, the exterior surface of the corneal part being composed of two differently curved surfaces, and the interior surface being only one single surface.

JOSEF DALLOS.